(12) United States Patent
Shannon et al.

(10) Patent No.: US 11,260,435 B2
(45) Date of Patent: Mar. 1, 2022

(54) METHOD AND APPARATUS FOR CLEANING AND REMOVING CONTAMINANTS FROM THE INTERIOR OF A LUBRICANT RUN-DOWN TANK

(71) Applicant: Petrolink USA, LLC, Pearland, TX (US)

(72) Inventors: James Shannon, Pearland, TX (US); Tim McKeithen, Pearland, TX (US); Larry Jordan, Pearland, TX (US); Brian Cummings, Pearland, TX (US)

(73) Assignee: Petrolink USA, LLC, Pearland, TX (US)

( * ) Notice: Subject to any disclaimer, the term of this patent is extended or adjusted under 35 U.S.C. 154(b) by 1 day.

(21) Appl. No.: 16/598,238

(22) Filed: Oct. 10, 2019

(65) Prior Publication Data
US 2021/0107043 A1    Apr. 15, 2021

(51) Int. Cl.
  B08B 9/093    (2006.01)
  F01M 11/03    (2006.01)
  F01M 11/04    (2006.01)
(52) U.S. Cl.
  CPC ........... B08B 9/0933 (2013.01); F01M 11/03 (2013.01); F01M 11/04 (2013.01)

(58) Field of Classification Search
  None
  See application file for complete search history.

(56) References Cited

U.S. PATENT DOCUMENTS

| | | | | |
|---|---|---|---|---|
| RE19,374 E | * | 11/1934 | Butterworth | B63B 57/02 134/24 |
| 2,454,289 A | * | 11/1948 | Neef, Jr. | B08B 9/0804 134/81 |
| 4,817,653 A | * | 4/1989 | Krajicek | B08B 9/0933 134/168 R |

* cited by examiner

*Primary Examiner* — Eric W Golightly
(74) *Attorney, Agent, or Firm* — Randall Danskin P.S.

(57) ABSTRACT

A method and apparatus for cleaning, and removing contaminants from the interior of a lubrication rundown tank of a mechanical system provides a source of pressurized and heated cleaning fluid containing at least one solvent; a first jumper hose communicating between the source of pressurized cleaning fluid and the interior of the lubrication rundown tank; a second jumper hose communicating between the interior of the lubrication rundown tank and a dirty fluid collection body; and an outlet spray nozzle carried by a nozzle extension placed within the interior of the lubrication rundown tank and in fluid communication with the source of pressurized and heated cleaning fluid to receive the pressurized and heated cleaning fluid therefrom.

15 Claims, 7 Drawing Sheets

METHOD AND APPARATUS FOR CLEANING AND REMOVING CONTAMINANTS FROM THE INTERIOR OF A LUBRICANT RUN-DOWN TANK

TECHNICAL FIELD

The present invention relates to emergency backup lubrication for mechanical systems, and more particularly to a method and apparatus for cleaning and removing contaminants from the interior of a lubricant run-down tank.

BACKGROUND OF THE INVENTION

Machinery with rotors, such as generators, steam and gas turbines, and large motors, commonly use journal type main bearings. In a journal bearing, a rotor shaft is supported in a journal on a film of oil, which provides clearance between the journal and the bearing inner surface. Oil circulates through the bearing via a pump, filter, reservoir and cooler. Circulation of the oil maintains the oil film, cools the bearing, and removes contaminants. If oil pressure is lost, the film of oil dissipates, and the journal settles onto the bearing surface which then frictionally overheats, causing extensive damage to the shaft, bearing and other parts.

During machinery startup, rotor shaft speed increases from zero to the operating speed, and during shutdown (controlled or emergency) rotor speed decays from the operating speed down to zero. The time period in which the rotor speed decays from the operating speed until a complete stoppage is known as a "coast-down period" or "run-down period".

Although rotor shaft speed gradually decays during the coast-down period, static loads and coefficient of friction remain constant. Therefore, the rotor-bearing system continues to generate heat, and for that reason the bearings still require continuous supply of lubricant until the rotor shaft comes to a complete stop.

Unfortunately, there are occasionally emergency shut-down events when lubrication oil pumps are not operable during the coast down period, and while the bearings still require continuous lubrication to avoid heat caused damage. A lubrication oil run-down tank is one solution to provide coast-down period lubrication when the oil pumps are not functioning.

A lubrication oil run-down tank is a storage vessel which is installed at a height above the mechanical system. The rundown tank holds a volume of lubricating oil during normal operation and provides gravity flow of the lubricating oil to the bearings during the coast-down period.

In the event of an emergency shut-down, the elevation of the rundown tank above the mechanical system, provides a static head and gravity flow of the lubricating oil from the rundown tank to a supply header and to the bearings, to maintain lubricant flow for the duration of the coast down period.

During normal operation of the mechanical system, there is a slow, but continuous flow of lubricating oil into the lubrication rundown tank. This continuous flow is recycled back to the lubrication oil reservoir via an overflow port and an overflow line. However, because this continuous flow is slow, and because this flow originates from the lubrication oil reservoir of the mechanical system, over time the lubricating oil within the rundown tank becomes contaminated, dirty and possibly otherwise "compromised". Because the run-down tank is "filled" from the bottom, and the "overflow" is taken/drained from the "top" or upper portions of the run-down tank, dirt and sediment collect and settle within the run-down tank and on the interior facing walls of the run-down tank.

As a result, lubrication oil run down tank/vessels are known to have a higher level of contamination due to minimal flow, being open to the atmosphere, and being excluded from customary regular maintenance. This leads to lubricant having higher than desired levels of particles and contaminants being retained in the lubricant rundown tank and possibly flowing into the bearings, and related machinery, during a coast down period.

It is imperative to remove these sediments, dirt, and contaminants from the interior of the lubricant run-down tank during cleaning operations and maintenance services. The present inventive method and apparatus provides such a method and apparatus for removing these sediments, dirt and contaminants.

SUMMARY OF THE INVENTION

A principle aspect of the present invention is a method and apparatus for removing contaminants from, and for cleaning the interior of a lubricant run-down tank of a mechanical system that uses a continuous and pressurized flow of lubricant to lubricate and remove heat from a plurality of interconnected components that move relative to one another when the mechanical system is in an operating state, and when the mechanical system is removed from the operating state, the mechanical system transitions through a coast period of time, during which period of time momentum, and inertia, cause the plurality of interconnected components to continue to move relative to one another, while the lubricant is not in a pressurized state, the method and apparatus comprising the steps; providing a lubricant run-down tank having an interior volume; placing the mechanical system in a non-operating state; removing lubricant from the interior volume of the lubricant run-down tank; providing a source of heated pressurized cleaning fluid; providing a first temporary jumper hose defining a medial channel extending therethrough and in fluid carrying communication between the source of the heated pressurized cleaning fluid and a spray nozzle; providing an elongated rigid nozzle extension that defines a medial channel therethrough and having a connection flange at a first end communicating with the first to jumper hose; providing an outlet spray nozzle having at least one fluid nozzle opening; connecting the outlet spray nozzle to a second end of the elongated rigid nozzle extension; inserting the second end of the elongated rigid nozzle extension and outlet spray nozzle into the interior volume defined by the lubricant run-down tank and; interconnecting the elongated rigid nozzle extension to the lubricant run-down tank; supplying the heated pressurized cleaning fluid from the source of heated pressurized cleaning fluid to and through the first temporary jumper hose, to the elongated rigid nozzle extension and to the outlet spray nozzle; spraying the entirety of the interior facing surfaces of the interior volume of the lubricant run-down tank with the heated pressurized cleaning fluid; discontinuing the supply of heated pressurized cleaning fluid to the outlet spray nozzle; venting fumes and vapors from within the interior volume of the lubricant run-down tank; removing dirty cleaning fluid and removed contaminants from the interior volume of the lubricant run-down-tank; disconnecting the elongated rigid nozzle extension from the lubricant run-down tank; and removing the outlet spray nozzle and the elongated rigid nozzle extension from the interior volume of the lubricant run-down tank.

A further aspect of the present invention is a method and apparatus wherein the lubricant run-down tank has an exterior facing surface, an interior facing surface, defines an interior volume, has an input sealing flange on the exterior facing surface that defines an orifice communicating with the interior volume and has an overflow sealing flange on the exterior facing surface that defines an orifice communicating with the interior volume and the overflow orifice is vertically spaced apart from the input orifice.

A further aspect of the present invention is the step allowing the mechanical system to pass through the coast-down period of time so that the plurality of interconnected components, are no longer moving relative to one another.

A further aspect of the present invention is wherein the heated pressurized cleaning fluid is comprised of at least a solvent and a flushing oil, and the cleaning fluid is heated to a temperature of approximately 120-170° F. and even more particularly to a temperature range of approximately between 130-160° F., and even with more particularity, to a temperature range of approximately between 140-150° F.

A further aspect of the present invention is wherein the first temporary jumper hose is in fluid carrying communication between the source of the heated pressurized cleaning fluid and a connection flange carried at a first end of an elongated rigid nozzle extension, and the elongated rigid nozzle extension further has a second end spaced apart from the first end by a known distance, and the elongated nozzle extension defines a medial channel extending between the first end and the second end, has an outer circumferential surface, and a sealing flange on the outer circumferential surface between the first and second ends for fluid tight interconnection with the overflow sealing flange of the lubricant run-down tank.

A further aspect of the present invention is wherein the outlet spray nozzle is releasably carried at the second end of the elongated rigid nozzle extension, and the outlet spray nozzle has a generally spherically shaped body with an exterior facing surface, an equatorial circumference defining a diameter, first and second diametrically opposing poles opposite the equatorial circumference, an axis of rotation that extends between the first and second poles, and defining a partial channel generally between the first and second poles, and at least one fluid nozzle opening that communicates between the exterior facing surface of the generally spherical shaped body and the partial channel to receive the heated pressurized cleaning fluid from the interconnected elongated rigid nozzle extension, and when the heated pressurized cleaning fluid exits the generally spherical shaped nozzle body through the at least one fluid nozzle opening, while under pressure, a thrust force is generated which causes the generally spherical shaped body to rotate relative to the rigid nozzle extension about the axis of rotation.

A further aspect of the present invention is wherein the second end of the elongated rigid nozzle extension carrying the interconnected outlet spray nozzle is inserted through the orifice defined by the overflow sealing flange of the lubricant run-down tank so that the outlet spray nozzle, and at least a portion of the elongated rigid nozzle extension are within the interior volume defined by the lubricant run-down tank and the outlet spray nozzle is positioned somewhat medially within the interior volume defined by the lubricant run-down tank.

A further aspect of the present invention is wherein the sealing flange carried by the elongated rigid nozzle extension between the first and second ends thereof is releasably interconnected to the overflow sealing flange of the lubricant run-down tank to provide a fluid tight interconnection therebetween.

A further aspect of the present invention is wherein the heated pressurized cleaning fluid from the source of heated pressurized cleaning fluid is supplied to the first temporary jumper hose, and to the elongated rigid nozzle extension and to the outlet spray nozzle so that the heated pressurized cleaning fluid exits the fluid nozzle opening under pressure which causes the generally spherical shaped body of the outlet spray nozzle to rotate about the axis of rotation relative to the elongated rigid nozzle extension, and the heated pressurized cleaning fluid exits the fluid nozzle opening in a shape a fan of spray that is at least 180° in arc.

A further aspect of the present invention is wherein the spraying of the heated pressurized cleaning fluid, for a predetermined amount of time, upon the entirety of the interior facing surfaces of the interior volume of the lubricant run-down tank causes the heated pressurized cleaning fluid to impact and cover the interior facing walls of the interior volume of the lubricant run-down tank and remove accumulated contaminants on the interior facing surfaces of the lubricant run-down tank.

A further aspect of the present invention further comprises the step disconnecting the sealing flange carried by the elongated rigid nozzle extension from the overflow sealing flange of the lubricant run-down tank and removing the outlet spray nozzle and portion of the elongated rigid nozzle extension from the interior volume of the lubricant run-down tank by disconnecting the sealing flanges and withdrawing the outlet spray nozzle and second end portion of the conduit.

A still further aspect of the present invention is a method and apparatus for removing contaminants from, and for cleaning the interior facing surfaces of a lubricant run-down tank of a mechanical system that uses a continuous and pressurized flow of a petroleum based lubricant to lubricate and remove heat from a plurality of interconnected components and bearings that move relative to one another when the mechanical system is in an operating state, and when the mechanical system is removed from the operating state, the mechanical system transitions through a coast-down period of time during which period of time momentum and inertia cause the plurality of interconnected components and bearings to continue to move relative to one another, while the lubricant is not in a pressurized state, the method and apparatus comprising the steps: providing a lubricant run-down tank that has an exterior facing surface, an interior facing surface, defines an interior volume, has an input sealing flange on the exterior facing surface that defines an input orifice communicating with the interior volume, and has an overflow sealing flange on the exterior facing surface that defines an overflow orifice communicating with the interior volume and the overflow sealing flange and the input sealing flange are vertically spaced apart from one another; placing the mechanical system in a non-operating state and allowing the mechanical system to pass through the coast-down period of time so that the plurality of interconnected components and bearings are no longer moving relative to one another; removing lubricant from the interior volume defined by the lubricant run-down tank; providing a source of heated pressurized cleaning fluid, the heated pressurized cleaning fluid comprising at least a solvent and a flushing oil, and heated to a temperature of approximately 120-170° F. and pressurized to approximately 25-150 PSI; providing a first temporary jumper hose in fluid carrying communication between the source of the heated pressurized cleaning fluid and a connection flange carried at a first end of an elongated rigid nozzle extension, the elongated rigid nozzle extension further having a second end spaced apart from the first end by a known distance, and defining a medial channel extending between the first end and the second end, an outer circumferential surface, a sealing flange on the outer circumferential surface between the first and second ends for fluid tight interconnection with the overflow sealing flange of the lubricant run-down tank; providing an outlet spray nozzle that is releasably carried at the second end of the elongated rigid nozzle extension, and the outlet spray nozzle has a generally spherically shaped body with an exterior facing surface, an equatorial circumference defining a diameter, first and second diametrically opposing poles opposite the equatorial circumference, an axis of rotation that extends between the first and second poles, and defining a partial channel that extends diametrically partially through the generally spherical shaped body between the first and second poles, and at least one fluid nozzle opening that communicates between the exterior facing surface of the generally spherical shaped body and the partial channel to receive the heated pressurized cleaning fluid from the interconnected elongated rigid nozzle extension, and when the heated pressurized cleaning fluid exits the generally spherical shaped nozzle body through the at least one fluid nozzle opening, while under pressure at a flow rate of approximately 10-40 gallons per minute (GPM) and even more particularly at a flow rate of approximately 15-30 gallons per minute (GPM), a thrust force is generated which causes the generally spherical shaped body to rotate, relative to the rigid elongate nozzle extension, about the axis of rotation; inserting the second end of the elongated rigid nozzle extension carrying the interconnected outlet spray nozzle through the orifice defined by the overflow sealing flange of the lubricant run-down tank so that the outlet spray nozzle, and at least a portion of the elongated rigid nozzle extension are within the interior volume defined by the lubricant run-down tank and the outlet spray nozzle is positioned somewhat medially within the interior volume defined by the lubricant run-down tank; interconnecting the sealing flange carried by the elongated rigid nozzle extension to the overflow sealing flange of the lubricant run-down tank to provide a fluid tight interconnection therebetween; providing a second temporary jumper hose having a first end portion and a spaced apart second end portion and defining a channel extending therethrough, and interconnecting the first end of the second temporary jumper hose to the input sealing flange of the lubricant rundown tank and connecting the second end of the second temporary jumper hose to a collection body to receive dirty cleaning fluid therefrom; supplying the heated pressurized cleaning fluid from the source of heated pressurized cleaning fluid to the first temporary jumper hoses, and to the elongated rigid nozzle extension and to the outlet spray nozzle so that the heated pressurized cleaning fluid exits the fluid nozzle opening under pressure which causes the generally spherical shaped body of the outlet spray nozzle to rotate about the axis of rotation, relative to the elongated rigid nozzle extension, and the heated pressurized cleaning fluid exits the fluid nozzle opening in a shape a fan of spray that is at least 180° in arc and at a flow rate of approximately 10-40 GPM; spraying, for a predetermined amount of time, the entirety of the interior facing surfaces of the interior volume of the lubricant run-down tank with the heated pressurized cleaning fluid from the outlet spray nozzle so that the heated pressurized cleaning fluid impacts and covers the interior facing surfaces of the interior volume of the lubricant run-down tank and removes accumulated contaminants from the interior facing surfaces of the lubricant run-down tank; discontinuing the supply of heated pressurized cleaning fluid to the first temporary jumper hose and outlet spray nozzle and venting fumes and vapors from within the interior volume of the lubricant run-down tank;

removing the cleaning fluid and removed contaminants from the interior volume of the lubricant run-down tank through the second temporary jumper hose; and disconnecting the sealing flange carried by the elongated rigid nozzle extension from the overflow sealing flange of the lubricant run-down tank and removing the outlet spray nozzle and portion of the elongated rigid nozzle extension from the interior volume of the lubricant run-down tank by disconnecting the sealing flanges and withdrawing the outlet spray nozzle and second end portion of the conduit.

A still further aspect of the present invention is wherein the at least one fluid nozzle opening defined in the generally spherical shaped body of the outlet spray nozzle is angular relative to the axis of rotation of the generally spherical shaped body.

BRIEF DESCRIPTION OF THE DRAWINGS

Preferred embodiments of the invention are described, below, with reference to the following accompanying drawings.

DETAILED DESCRIPTION OF THE PREFERRED EMBODIMENTS

This disclosure of the invention is submitted in furtherance of the Constitutional purposes of the U.S. Patent Laws "to promote the progress of science and useful arts" (Article 1, Section 8).

As discussed earlier in this application, one of the many problems confronting owners and operators of large mechanical systems is maintaining sufficient and continuous lubricant flow, for the entire coast-down period, in the event of a power loss that causes an uncontrolled/emergency stop. Although lubricant rundown tanks and related apparatus have provided a safety measure to address such situations, this solution has generated its own problems, namely the need for maintaining and cleaning the lubricant rundown tanks which, by their very nature, tend to collect and retain dirt, sediment and contaminants which may be released into the mechanical system at critical times when lubrication is essential and the mechanical system is at its greatest vulnerability to overheating and damage due to lost pressurized lubrication.

Figure 1:
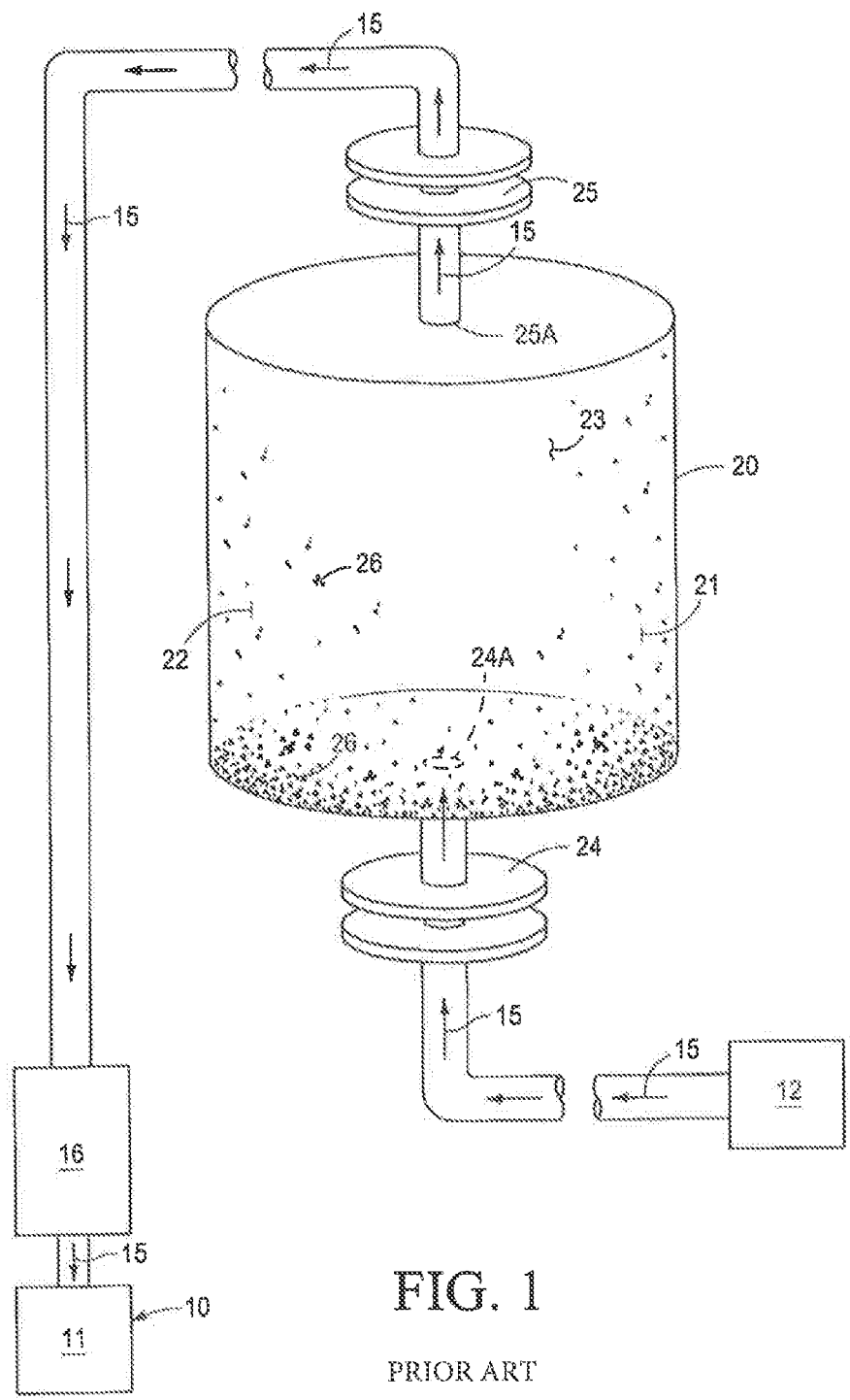
FIG. 1 is a graphical representation a typical lubricant rundown tank showing the flow of lubricant therethrough and collection of contaminants therein.

FIG. 1 shows a known plumbing configuration of a lubricant rundown tank 20 which is in fluid communication with a pressurized source 12 of lubricant 15 which passes through a known plumbing connection (pipe) to an input sealing flange 24 which defines an input orifice 24A in fluid communication, with an interior volume 23 of the lubricant rundown tank 20. The input orifice 24A may be positioned spacedly above the interior bottom surface 22 of the lubricant rundown tank 20 so that contaminants 26, dirt, and the like, that collect within the interior volume 23 are separated from the orifice 24A. This physical separation of the orifice 24A from the bottom interior surface 22 may be accomplished by placing the orifice 24A at the end of a stub pipe (not shown) that extends into the interior volume 23. The lubricant rundown tank 20 has an exterior facing surface 21 and an interior facing surface 22 and the lubricant rundown tank 20 still further has an overflow sealing flange 25 that defines an overflow orifice 25A that communicates with the interior volume 23 and is vertically spaced apart from the input sealing flange 24. In FIG. 1, the input orifice 24A is located at a bottom/lower portion of the lubricant rundown tank 20, while the overflow orifice 25A is located at a top/upper portion of the lubricant rundown tank 20. Although this placement is common, other positions and placements of the orifices 24A, 25A are also contemplated. The vertical spacing of the input orifice 24A and the overflow orifice 25A is conducive to the slow and continuous flow of lubricant oil 15 into the interior volume 23, as noted previously in this application and allows the lubricant 15 in the lubrication rundown tank 20 to be gradually heated to operating temperature as lubricant continuously flows into the tank 20 from the source 12. Also as shown in FIG. 1, contaminants 26 which may include dirt, sediment, and other debris have the tendency to collect within the interior volume 23 of the lubricant rundown tank 20. Still further, as shown in FIG. 1, the overflow sealing flange 25 is in fluid communication with a lubrication header 16 which distributes the lubricant 15 to the plurality of interconnected mechanical components 11, including but not limited to bearings (not shown). The vertical height of the lubricant rundown tank 20 above the lubrication header 16 and mechanical components 11 provides a static head of fluid pressure.

Figure 2:
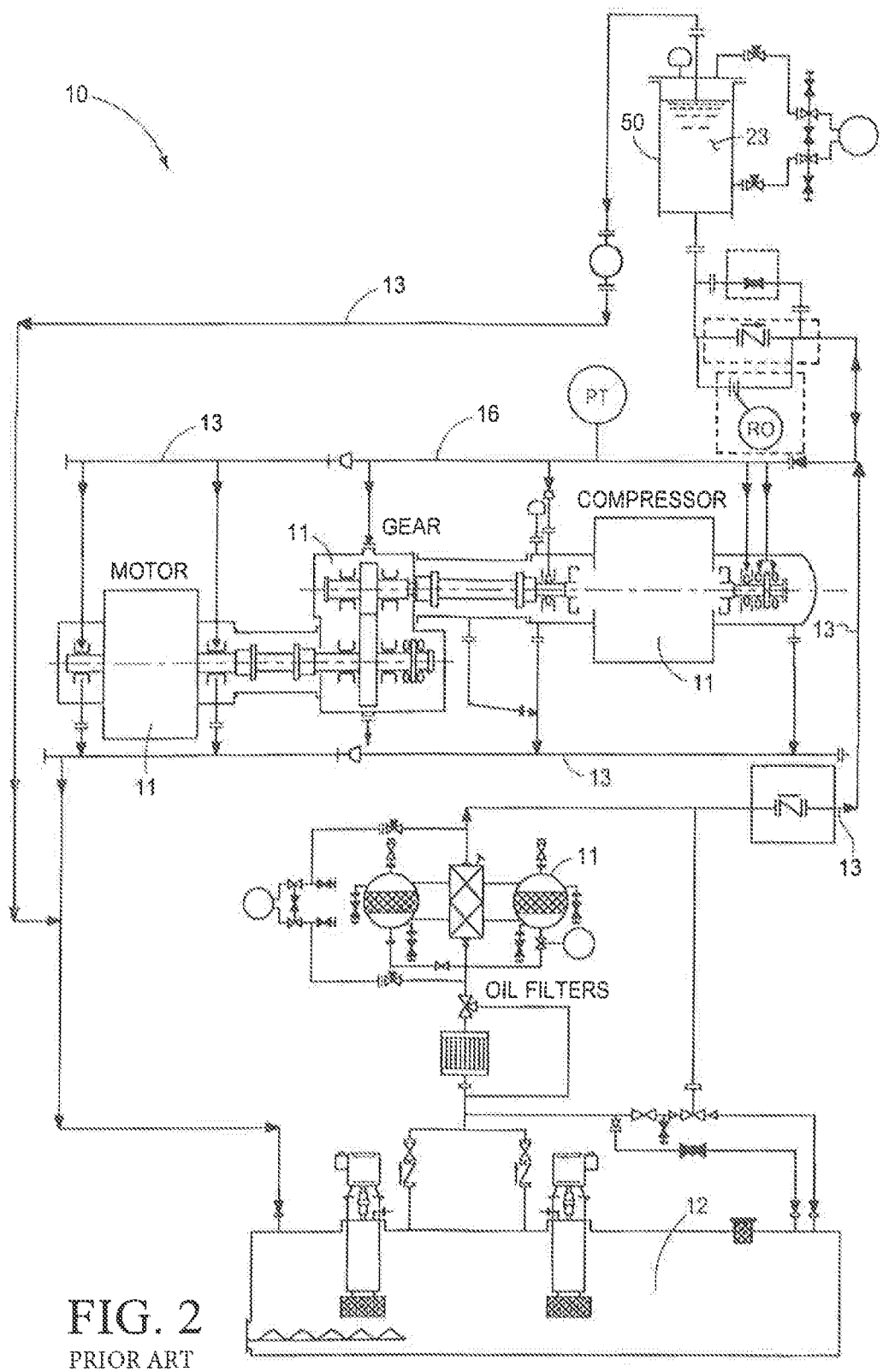
FIG. 2 is a greatly simplified schematic view of a typical mechanical system for which the instant inventive method is applicable, showing the relationship between the lubricant reservoir, the oil filters, the motor, gear and compressor and the lubricant rundown tank.

FIG. 2 is a schematic view of a known mechanical system, indicated by the numeral 10 generally, showing various components including a source/reservoir of lubricant 12, oil filters, a compressor, a gear train, a motor (11 collectively). FIG. 2 also shows a lubricant rundown tank 50 in fluid communication with the mechanical system 10 and showing the continuous flow direction 13 of lubricant 15 from the source of lubricant 12, through the various components 11 and into the lubricant run-down tank 50 and out of the lubricant run-down tank 50 and back to the lubrication header 16.

Figure 3:
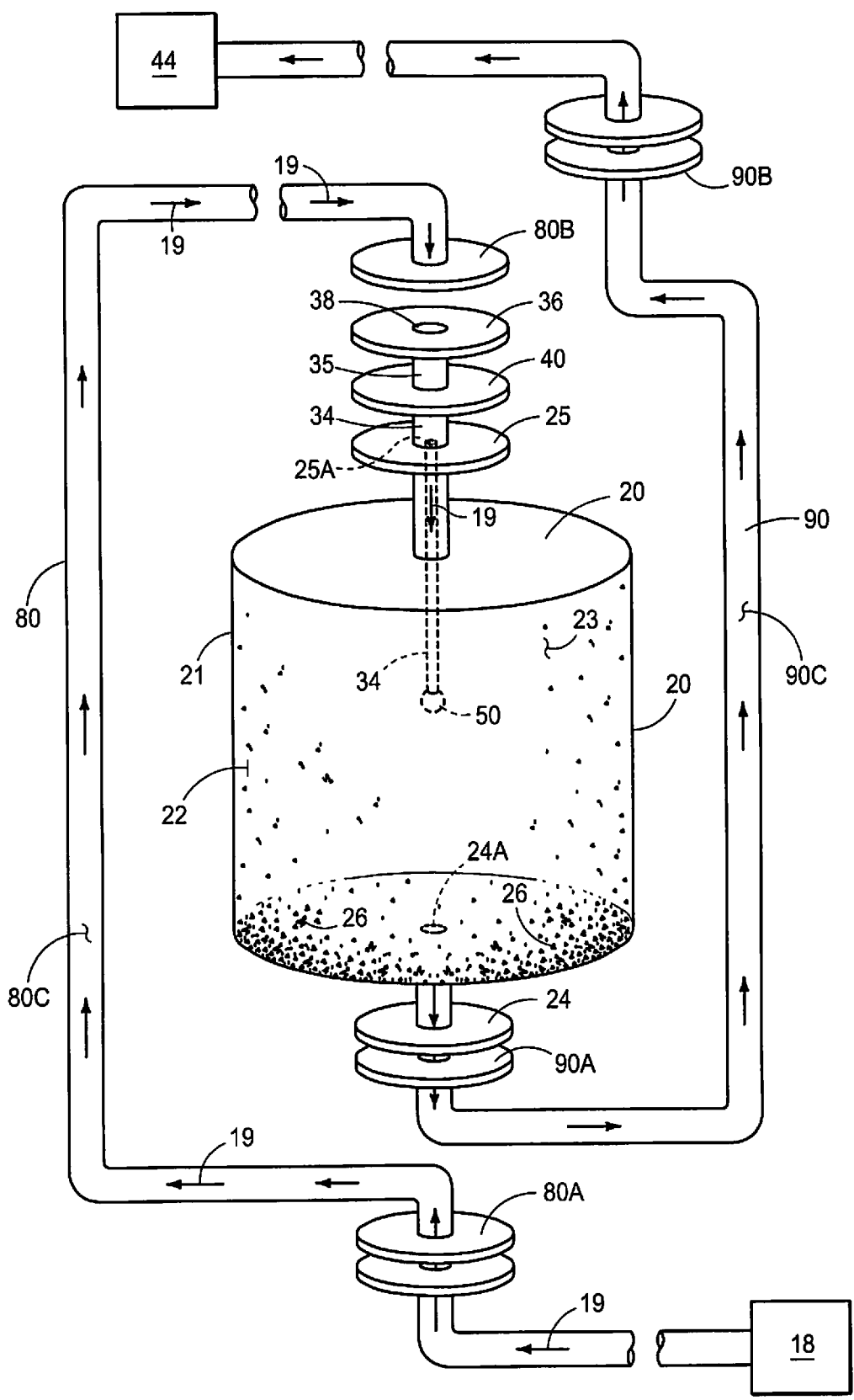
FIG. 3 is an orthographic side view of a lubricant rundown tank plumbed according to the current inventive method for cleaning and contaminant removal.
Figure 4:
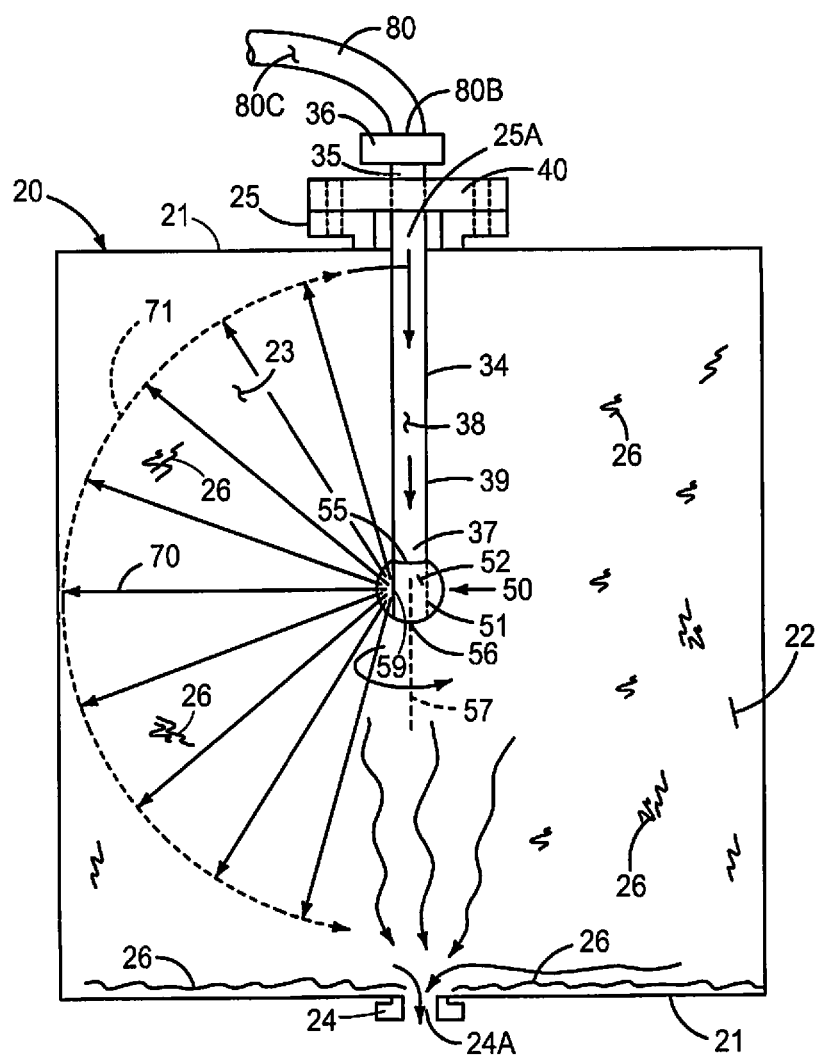
FIG. 4 is an artistic representation of a cutaway view of the instant cleaning method in operation, showing the contaminant removal from the interior of a lubricant rundown tank.
Figures 5, 6:
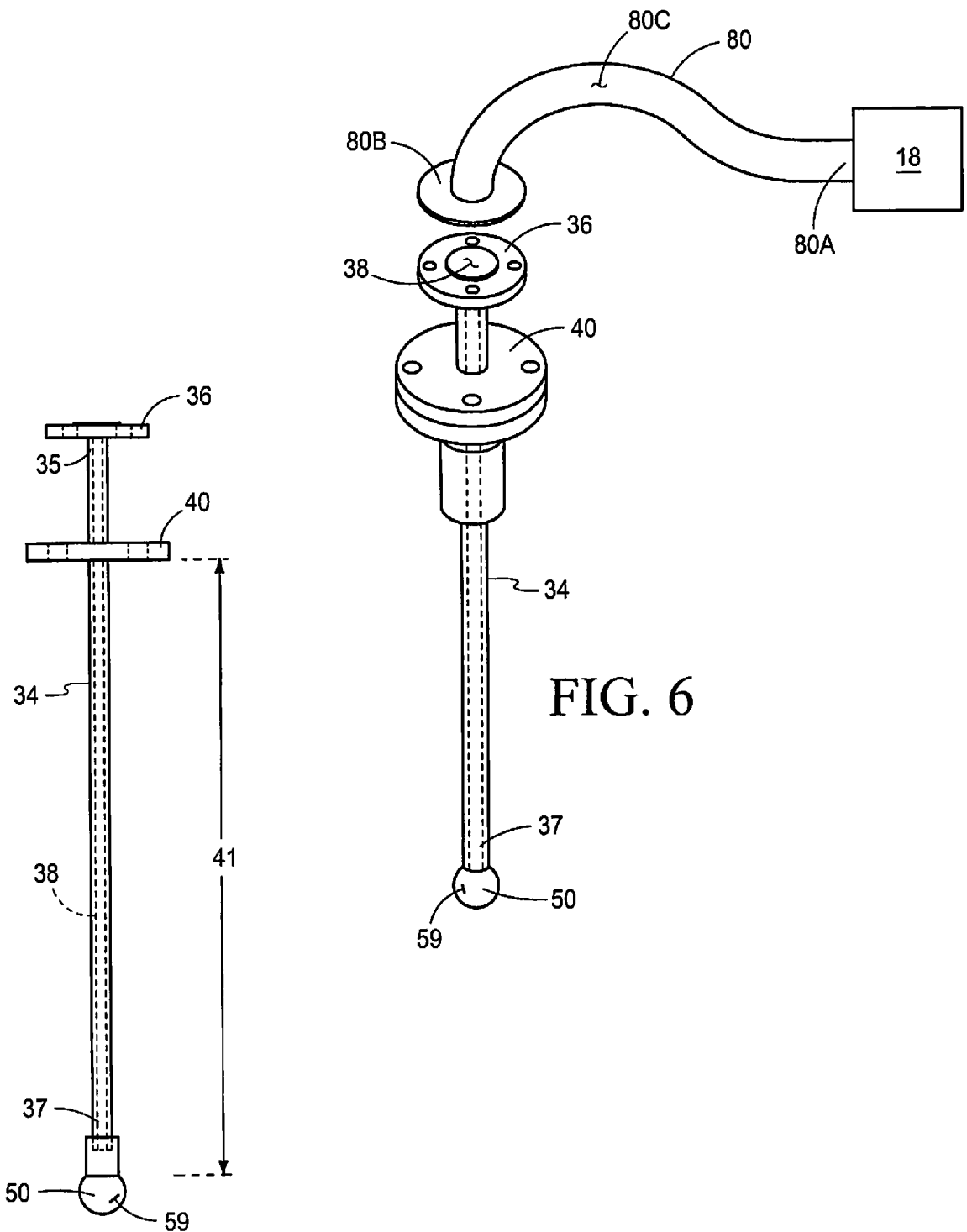
FIG. 5 is an enlarged orthographic side view of the elongated nozzle extension and the outlet spray nozzle.
FIG. 6 is an enlarged isometric top and side view of the outlet spray nozzle, the connection flange and the first temporary jumper hose.
Figure 7:
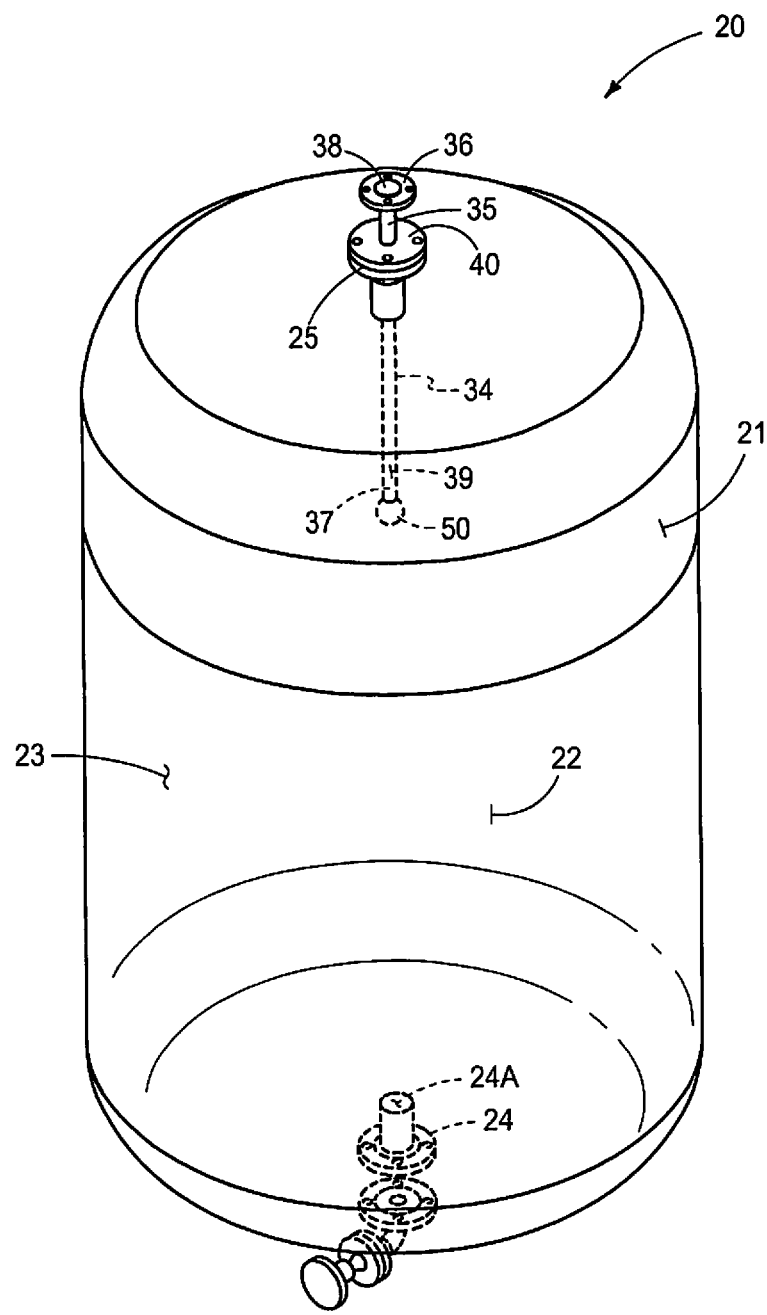
FIG. 7 is partial cutaway isometric top and side view of a lubricant rundown tank showing the input sealing flange at the bottom portion of the lubricant rundown tank and the overflow sealing flange at the upper end portion of the lubricant rundown tank with the elongated rigid nozzle extension installed within the lubricant rundown tank.

FIG. 3 is similar to FIG. 1, but shows the apparatus of the instant inventive method which provides for cleaning of the interior surfaces 22 of the lubricant rundown tank 20, and removal of contaminants 26 from the interior volume 23. The instant apparatus and method generally provides a source 18 of heated pressurized cleaning fluid 19; the lubricant rundown tank 20; an elongated rigid nozzle extension 34; a dirty cleaning fluid collection body 44, an outlet spray nozzle 50; a first temporary jumper hose 80; a second temporary jumper hose 90 and related plumbing interconnections.

As a first step, and before cleaning of the lubrication rundown tank 20 interior surfaces 22 can begin, the lubrication rundown tank 20 must be disconnected from the mechanical system 10 and the pressurized lubricant system thereof. More specifically, the lubricating oil 15 within the tank 20 must be drained from the interior volume 23 and the plumbing interconnections at the input sealing flange 24 must be disconnected from the source 12 of pressurized lubricant. Further the plumbing interconnections at the overflow sealing flange 25 must be disconnected from the lubrication header 16. The removed lubricating oil 15 should be stored/treated/cleaned/disposed of as required.

The first temporary jumper hose 80 (FIG. 3) is elongate and defines a medial channel 80C that extends therethrough and has a first supply end connection 80A that is placed in fluid communication with the source 18 of heated pressurized cleaning fluid 19. The first temporary jumper hose 80 further has a second, and spaced apart, discharge end connection 80B. The first temporary jumper hose 80 facilitates, and provides a means for injecting the heated pressurized cleaning fluid 19 into the interior volume 23 of the lubricant rundown tank 20.

The second temporary jumper hose 90 (FIG. 3) is elongate and defines a medial channel 90C that extends therethrough and has a first supply end connection 90A that is placed in fluid tight communication with the input orifice 24A of the lubricant rundown tank 20, and is interconnected therewith to the input sealing flange 24. The second temporary jumper hose 90 further has a second, and spaced apart, discharge end connection 90B that is interconnected with, and in fluid communication with, the dirty cleaning fluid collection body 44. The second temporary jumper hose 90 provides a fluid carrying means for removing dirty cleaning fluid and removed debris, sediment and dirt from the interior volume 23 of the lubricant rundown tank 20.

The first temporary jumper hose 80 and the second temporary jumper hose 90 reverse the direction of fluid flow through the lubricant rundown tank 20 and provide for a dual pressurized wash system and a gravitational wash system which causes the dirty cleaning fluid 19 and the removed debris/contaminants/dirt 26 to exit the interior volume 23 of the lubricant rundown tank 20 through the input orifice 24A of the rundown tank 20.

The cleaning fluid 19 is heated preferably to a temperature of about 120-170° F. and is pressurized to a pressure of approximately 25-150 PSI. The heat, and pressure of the cleaning fluid 19 causes the cleaning fluid 19 to use impact forces and, thermal forces and solvent chemical reactions to dissolve, soften and remove the contaminants 26 from within the interior volume 23 of the lubricant rundown tank 20. The multi-faceted (heat, pressure, chemical reaction) cleaning action of the cleaning fluid 19 enhances the reactivity of the cleaning fluid 19 to dissolve, soften, detach, and flush away the contaminants 26 from within the interior volume 23 of the lubricant rundown tank 20.

The heated and pressurized cleaning fluid 19 is dispersed/sprayed into the interior volume 23 of the lubricant rundown tank 20 by means of the outlet spray nozzle 50 that is carried at a second end portion of the elongated rigid nozzle extension 34 that is in fluid communication with the first temporary jumper hose 80 and the source 18 of heated pressurized cleaning fluid 19.

Figure 8:
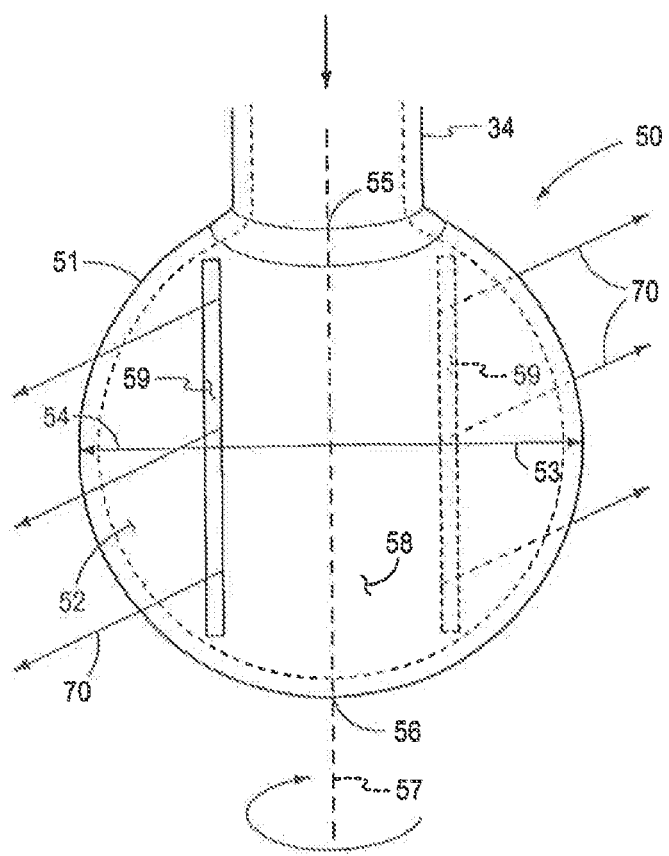
FIG. 8 is an enlarged view of the outlet spray nozzle showing the details thereof.

As best shown in FIG. 8, the outlet spray nozzle 50 has a generally spherically shaped body 51 with an exterior facing surface 52, and an equatorial circumference 53 defining a diameter 54, first 55 and second 56 diametrically opposing poles opposite the equatorial circumference 53, and an axis of rotation 57 that extends between the first 55 and second 56 poles, and the body 51 defines a partial channel 58 that extends diametrically partially through the generally spherical shaped body 51 between the first 55 and second 56 poles, and at least one fluid nozzle opening 59 that communicates between the exterior facing surface 52 of the generally spherical shaped body 51 and the partial channel 58 to receive the heated pressurized cleaning fluid 19 from the interconnected elongated rigid nozzle extension 34. When the heated pressurized cleaning fluid 19 exits the generally spherical shaped nozzle body 51 through the at least one fluid nozzle opening 59, while under pressure, a thrust force 70 is generated which causes the generally spherical shaped body 51 to rotate relative to the rigid nozzle extension 34 about the axis of rotation 57.

A lubricant run-down tank 20 is provided. The lubrication rundown tank 20 has an exterior facing surface 21, an interior facing surface 22 and defines an interior volume 23, and has an input sealing flange 24 on the exterior facing surface 21 that defines an input orifice 24A communicating with the interior volume 23, and that has an overflow sealing flange 25 on the exterior facing surface 21 that defines an overflow orifice 25A communicating with the interior volume 23, and the overflow orifice 25A and the input orifice 24A are vertically spaced apart from one another.

The mechanical system 10 is placed in a non-operating state and the mechanical system 10 is allowed to pass through the run-down (coast-down) period of time so that the plurality of interconnected components 11 are no longer moving relative to one another.

Lubricant 15 is removed from the interior volume 23 defined by the lubricant run-down tank 20.

A source 18 of heated pressurized cleaning fluid 19 is provided. The heated pressurized cleaning fluid comprises at least one solvent and at least one flushing oil, and the cleaning fluid 19 is heated to a temperature of approximately 120-170° F.

A first temporary jumper hose 80 is provided and is placed in fluid carrying communication between the source 18 of the heated pressurized cleaning fluid 19. The first temporary jumper hose 80 further has a first supply end connection 80A, and a second, spaced apart, discharge end connection 80B, and defines a medial fluid carrying channel 80C communicating between the supply and 80A and the discharge and 80B.

An elongated rigid nozzle extension 34 is provided, and the nozzle extension 34 has a connection flange 36 at a first end 35 and the elongated rigid nozzle extension 34 further has a second end 37 spaced apart from the first end 35 by a known distance 41, and defines a medial channel 38 extending between the first end 35 and the second end 37. The nozzle extension 34 further has an outer circumferential surface 39, and has a sealing flange 40 on the outer circumferential surface 39 between the first and second ends 35, 37 for fluid tight interconnection with the overflow sealing flange 25 of the lubricant run-down tank 20. The connection flange 36 at the first end 35 of the elongated rigid nozzle extension 34 is interconnected with the discharge and 80B of the first temporary jumper hose 80 to receive the heated and pressurized cleaning fluid 19 there from.

An outlet spray nozzle 50 is provided and is releasably and rotatably carried at the second end 37 of the elongated rigid nozzle extension 34. As shown in FIG. 8, the outlet spray nozzle 50 has a generally spherically shaped body 51 with an exterior facing surface 52, an equatorial circumference 53 defining a diameter 54, first 55 and second 56 diametrically opposing poles opposite the equatorial circumference 53, an axis of rotation 57 that extends between the first 55 and second 56 poles. A partial channel 58 extends partially diametrically through the generally spherical shaped body 51 between the first 55 and second 56 poles, and at least one fluid nozzle opening 59 communicates between the exterior facing surface 52 of the generally spherical shaped body 51 and the partial channel 58 to receive the heated pressurized cleaning fluid 19 from the interconnected elongated rigid nozzle extension 34. When the heated pressurized cleaning fluid 19 exits the generally spherical shaped nozzle body 51 through the at least one fluid nozzle opening 59, while under pressure, a thrust force 70 is generated which causes the generally spherical shaped body 51 to rotate, relative to the rigid nozzle extension 34, about the axis of rotation 57.

The second end 37 of the elongated rigid nozzle extension 34 carrying the outlet spray nozzle 50 is inserted through the overflow orifice 25A defined by the overflow sealing flange 25 of the lubricant run-down tank 20 so that the outlet spray nozzle 50, and at least a portion of the elongated rigid nozzle extension 34 are positioned within the interior volume 23 defined by the lubricant run-down tank 20 and the outlet spray nozzle 50 is positioned somewhat medially within the interior volume 23.

The sealing flange 40 carried by the elongated rigid nozzle extension 34 is interconnected to the overflow sealing flange 25 of the lubricant run-down tank 20 to provide a fluid tight interconnection therebetween.

A second temporary jumper hose 90 is provided. The second temporary jumper hose 90 has a first supply end connection 90A and a second, spaced apart, discharge end connection 90B and defines a fluid carrying medial channel 90C that extends between the supply and 90A and the discharge and 90B. the supply end connection 90A of the second temporary jumper hose 90 is interconnected with the input sealing flange 24 of the lubrication rundown tank 20 so that the input orifice 24A and the medial channel 90C are in fluid receiving communication with one another. The discharge end connection 90B of the second temporary jumper hose 90 is interconnected with the dirty cleaning fluid receiving body 44 which is also provided.

A volume of heated and pressurized cleaning fluid 19 is supplied from the source 18 of heated pressurized cleaning fluid 19 to the supply and 80A of the first temporary jumper hose 80 and to the medial channel 80C, and to the elongated rigid nozzle extension 34 and to the outlet spray nozzle 50 so that the heated pressurized cleaning fluid 19 exits the at least one fluid nozzle opening 59 under pressure which causes the generally spherical shaped body 51 of the outlet spray nozzle 50 to rotate, relative to the elongated rigid nozzle extension 34, about the axis of rotation 57, and the heated pressurized cleaning fluid 19 exits the fluid nozzle opening 59 in a shape a fan of spray 71 that is at least 180° in arc and at a flow rate of approximately 10-40 gallons per minute. (GPM) and preferably at a flow rate of approximately 15-30 GPM.

The entirety of the interior facing surfaces 22 of the lubricant run-down tank 20 is sprayed with the heated pressurized cleaning fluid 19 from the outlet spray nozzle 50 so that the heated pressurized cleaning fluid 19 impacts and covers the interior facing surfaces 22 of the interior volume 23 of the lubricant run-down tank 20 and softens, dissolves and removes accumulated contaminants 26 on the interior facing surfaces 22 of the lubricant run-down tank 20. The continuous and complete spraying of the cleaning fluid 19 onto the interior facing surfaces 22, as is described herein, prevents "channeling" of the cleaning fluid which is known to leave concentrated deposits of contaminants and dirt on the interior surfaces. The softened, dissolved and removed debris, and the dirty collection fluid moves, under the influence of gravity, to the bottom/lower portions of the lubrication rundown tank 20.

After the predetermined period of time has expired, the supply of heated pressurized cleaning fluid 19 to the first temporary jumper hose 80 and outlet spray nozzle 50 is discontinued and the accumulated fumes and accumulated vapors are vented from within the interior volume 23 of the lubricant run-down tank 20, the accumulated debris 26 and dirty cleaning fluid 19 that has collected in the bottom interior 23 of the lubrication rundown tank 20 is removed from the interior volume 23 through the input orifice 24A, the input sealing flange 24 and the second temporary jumper hose 90. The removed dirty cleaning fluid 19 and removed contaminants 26 are removed to the dirty cleaning fluid collection body 44.

After the cleaning of the lubrication rundown tank 20 has been completed, and the dirty cleaning fluid 19 and removed contaminants 26 have been removed from the interior volume 23 of the tank 20, the sealing flange 40 of the elongated rigid nozzle extension 34 is disconnected from the overflow sealing flange 25 of the lubricant run-down tank 20 and removing the outlet spray nozzle 50 and portion of the elongated rigid nozzle extension 34 is drained from the interior volume 23 of the lubricant run-down tank 20.

The lubrication rundown tank 20 is thereafter reconnected to the mechanical system 10 by interconnecting the pressurized lubricant supply 12 plumbing connection to the input sealing flange 24, and also reconnecting the lubrication header 16 plumbing connections to the overflow flange 25. A supply of clean lubricating oil 15 must be added to the lubrication rundown tank 20 before the next startup of the mechanical system 10 so that lubrication is supplied to the mechanical system 10 as the mechanical system 10 undergoes startup and comes up to operating speed and operating pressure.

OPERATION

The operation of the described apparatus and method for cleaning, and removing contaminants from, an interior of a lubricant run down tank are believed to be readily apparent, and are briefly summarized at this point.

In its broadest aspect, the apparatus and method of cleaning, and removing contaminants 26 from, an interior of a lubrication run down tank 20 includes the steps of providing a lubricant run-down tank 20 that has an exterior facing surface 21, an interior facing surface 22, defines an interior volume 23, has an input sealing flange 24 on the exterior facing surface 21 that defines an input orifice 24A communicating with the interior volume 23 and has an overflow sealing flange 25 on the exterior surface 21 that defines an overflow orifice 25A communicating with the interior volume 23.

Placing the mechanical system 10, to which the lubrication rundown tank 20 is interconnected, in a non-operating state and allowing the mechanical system 10 to pass through the coast-down period of time so that the plurality of interconnected components 11 of the mechanical system 10 are no longer moving relative to one another. Removing the lubricating oil 15 from the interior volume 23 defined by the lubricant run-down tank 20.

Disconnecting the input sealing flange 24 from the source of lubricant 12 and disconnecting the overflow sealing flange 25 from the lubrication header 16 of the mechanical system 10.

Providing a source 18 of heated pressurized cleaning fluid, the heated pressurized cleaning fluid 19 composed of at least one solvent and at least one flushing oil, and heated to a temperature of approximately 120-170° F.

Providing a first temporary jumper hoses 80 that is in fluid carrying communication between the source 18 of the heated pressurized cleaning fluid 19 and the connection flange 36 carried at a first end 35 of the elongated rigid nozzle extension 34, the elongated rigid nozzle extension 34 further having a second end 37 spaced apart from the first end 35 by a known distance 41, and defining a medial channel 38 extending between the first end 35 and the second end 37, and having an outer circumferential surface 39, with a sealing flange 40 on the outer circumferential 39 surface between the first and second ends 35, 37 for fluid tight interconnection with the overflow sealing flange 25 of the lubricant run-down tank 20.

Providing a second temporary jumper hose 90 that is in fluid communication between the input sealing flange 24 of the lubricant rundown tank 20 and the dirty cleaning fluid collection body 44.

Providing an outlet spray nozzle 50 that is releasably carried at the second end 37 of the elongated rigid nozzle extension 34, and the outlet spray nozzle 50 has a generally spherically shaped body 51 with an exterior facing surface 52, an equatorial circumference 53 defining a diameter 54, first 55 and second 56 diametrically opposing poles opposite the equatorial circumference 53, an axis of rotation 57 that extends between the first and second poles 55, 56, and defining a partial channel 58 that extends diametrically partially through the generally spherical shaped body 51 between the first 55 and second 56 poles, and at least one fluid nozzle opening 59 that communicates between the exterior facing surface 52 of the generally spherical shaped body 51 and the partial channel 58 to receive the heated pressurized cleaning fluid 19 from the interconnected elongated rigid nozzle extension 34. When the heated pressurized cleaning fluid 19 exits the generally spherical shaped nozzle body 51 through the at least one fluid nozzle opening 59, while under pressure, a thrust force 70 is generated which causes the generally spherical shaped body 51 to rotate, relative to the rigid nozzle extension 34, about the axis of rotation 57.

Inserting the second end 37 of the elongated rigid nozzle extension 34 carrying the interconnected outlet spray nozzle 50 through the overflow orifice 25A defined by the overflow sealing flange 25 of the lubricant run-down tank 20 so that the outlet spray nozzle 50, and at least a portion of the elongated rigid nozzle extension 34 are within the interior volume 23 defined by the lubricant run-down tank 20 and the outlet spray nozzle 50 is positioned somewhat medially within the interior volume 23. Interconnecting the sealing flange 40 carried by the elongated rigid nozzle extension 34 to the overflow sealing flange 25 of the lubricant run-down tank 20 to provide a fluid tight interconnection therebetween.

Supplying the heated pressurized cleaning fluid 19 from the source 18 of heated pressurized cleaning fluid to the first temporary jumper hose 80, and to the elongated rigid nozzle extension 34 and to the outlet spray nozzle 50 so that the heated pressurized cleaning fluid 19 exits the at least one fluid nozzle opening 59 under pressure which causes the generally spherical shaped body 51 of the outlet spray nozzle 50 to rotate about the axis of rotation 57 relative to the elongated rigid nozzle extension 34, and the heated pressurized cleaning fluid 19 exits the fluid nozzle opening 59 in a shape a fan of spray 71 that is at least 180° in arc.

Spraying, for a predetermined amount of time, the entirety of the interior facing surfaces 22 of the lubrication run-down tank 20 with the heated pressurized cleaning fluid 19 from the outlet spray nozzle 50 so that the heated pressurized cleaning 19 fluid impacts and covers the interior facing surfaces 22 of the lubricant run-down tank 20 and dissolves, washes away and removes accumulated contaminants 26 on the interior facing surfaces 23 of the lubricant run-down tank 20 and prevents channeling of the contaminants 26 and cleaning fluid 19.

Discontinuing the supply of heated pressurized cleaning fluid 19 to the first temporary jumper hose 80 and the elongated rigid nozzle extension 34 and the outlet spray nozzle 50. Venting accumulated fumes and vapors from within the interior volume 23 of the lubricant run-down tank 20.

Removing the dirty cleaning fluid 19 and removed contaminants 26 from the interior volume 23 of the lubricant run-down tank 20 through the input sealing flange 24 and the second temporary jumper hose 90.

Disconnecting the sealing flange 40 of the elongated rigid nozzle extension 34 from the overflow sealing flange 25 of the lubricant run-down tank 20 and removing the outlet spray nozzle 50 and portion of the elongated rigid nozzle extension 34 from the interior volume 23 of the lubricant run-down tank 20.

We claim:

1. A method for removing contaminants from, and for cleaning the interior of, a lubricant run-down tank of a mechanical system that uses a continuous and pressurized flow of a petroleum based lubricant to lubricate and remove heat from a plurality of interconnected components that move relative to one another when the mechanical system is in an operating state, and when the mechanical system is removed from the operating state, the mechanical system transitions through a run-down period of time during which period of time momentum and inertia cause the plurality of interconnected components to continue to move relative to one another, while the petroleum based lubricant is not in a pressurized state, the method comprising the steps:

providing a lubricant run-down tank having an interior volume, having an input sealing flange communicating with a source of lubricant oil and having an overflow sealing flange communicating with the mechanical system;

placing the mechanical system in a non-operating state;

removing lubricant from the interior volume of the lubricant run-down tank;

providing a source of heated pressurized cleaning fluid;

providing a first temporary jumper hose in fluid carrying communication between the source of the heated pressurized cleaning fluid and a connection flange at an end portion of the first temporary jumper hose opposite the source of heated pressurized cleaning fluid;

providing a second temporary jumper hose in fluid communication between the input sealing flange of the lubricant run-down tank and a dirty cleaning fluid collection body;

providing an elongated rigid nozzle extension having a connection flange at a first end that is in fluid communication with the connection flange of the first temporary jumper hose;

providing an outlet spray nozzle having at least one fluid nozzle opening;

connecting the outlet spray nozzle to a second end of the elongated rigid nozzle extension opposite the connection flange;

inserting the second end of the elongated rigid nozzle extension and the outlet spray nozzle through the overflow sealing flange and into the interior volume defined by the lubricant run-down tank;

interconnecting the elongated rigid nozzle extension to the lubricant run-down tank;

supplying the heated pressurized cleaning fluid from the source of heated pressurized cleaning fluid to the first temporary jumper hose, to the elongated rigid nozzle extension and to the outlet spray nozzle;

spraying the entirety of the interior facing surfaces of the interior volume of the lubricant run-down tank with the heated pressurized cleaning fluid;

discontinuing the supply of heated pressurized cleaning fluid to the outlet spray nozzle;

venting fumes and vapors from within the interior volume of the lubricant run-down tank;

removing the cleaning fluid and removed contaminants from the interior volume of the lubricant run-down-tank through the input sealing flange and through the second temporary jumper hose for passage to the dirty cleaning fluid collection body;

disconnecting the elongated rigid nozzle extension from the lubricant run-down tank; and removing the outlet spray nozzle and the elongated rigid nozzle extension from the interior volume of the lubricant run-down tank.

2. The method of claim 1 and wherein the lubricant run-down tank has an exterior facing surface and the input sealing flange is on the exterior facing surface that defines an input orifice communicating with the interior volume, and the overflow sealing flange on the exterior surface, that defines an overflow orifice communicating with the interior volume.

3. The method of claim 1 and further comprising the step:
   allowing the mechanical system to pass through the run-down period of time so that the plurality of interconnected components are no longer moving relative to one another.

4. The method of claim 1 and wherein the heated pressurized cleaning fluid is composed of at least one solvent and at least one flushing oil, and heated to a temperature of approximately 120-170° F.

5. The method of claim 1 and wherein the heated pressurized cleaning fluid is composed of at least one solvent and at least one flushing oil, and heated to a temperature of approximately 140-150° F.

6. The method of claim 1 and wherein the first temporary jumper hose is in fluid carrying communication between the source of the heated pressurized cleaning fluid and the connection flange carried at the first end of the elongated rigid nozzle extension, the elongated rigid nozzle extension having a second end spaced apart from the first end by a known distance, and the elongated rigid nozzle extension defines a medial channel extending between the elongated rigid nozzle extension first end and the second end, an outer circumferential surface, a sealing flange on the outer circumferential surface between the elongated rigid nozzle extension first and second ends for fluid tight interconnection with the overflow sealing flange of the lubricant run-down tank.

7. The method of claim 1 and wherein the outlet spray nozzle is releasably, and axially rotatable, carried at the second end of the elongated rigid nozzle extension, and the outlet spray nozzle has a generally spherical shaped body with an exterior facing surface, an equatorial circumference defining a diameter, first and second diametrically opposing poles opposite the equatorial circumference, an axis of rotation that extends between the first and second poles, and defining a channel that extends partially diametrically through the generally spherical shaped body between the first and second poles, and at least one fluid nozzle opening that communicates between the exterior facing surface of the generally spherical shaped body and the channel to receive the heated pressurized cleaning fluid from the interconnected elongated rigid nozzle extension, and when the heated pressurized cleaning fluid exits the generally spherical shaped nozzle body through the at least one fluid nozzle opening, while under pressure, a thrust force is generated which causes the generally spherical shaped body to rotate relative to the rigid nozzle extension about the axis of rotation.

8. The method of claim 1 and wherein the second end of the elongated rigid nozzle extension carrying the interconnected outlet spray nozzle is inserted through an overflow orifice defined by the overflow sealing flange of the lubricant run-down tank so that the outlet spray nozzle, and at least a portion of the elongated rigid nozzle extension are within the interior volume defined by the lubricant run-down tank and the outlet spray nozzle is positioned somewhat medially within the interior volume defined by the lubricant run-down tank.

9. The method of claim 1 and wherein the connection flange carried by the elongated rigid nozzle extension is interconnected in fluid flowing engagement to the overflow sealing flange of the lubricant run-down tank to provide a fluid tight interconnection therebetween.

10. The method of claim 1 and wherein the heated pressurized cleaning fluid from the source of heated pressurized cleaning fluid is supplied to the first temporary jumper hose, and to the elongated rigid nozzle extension and to the outlet spray nozzle so that the heated pressurized cleaning fluid exits the fluid nozzle opening under pressure which causes a generally spherical shaped body of the outlet spray nozzle to rotate about an axis of rotation relative to the elongated rigid nozzle extension, and the heated pressurized cleaning fluid exits the fluid nozzle opening in a shape a fan of spray that is at least 180° in arc.

11. The method of claim 1 and wherein the spraying of the heated pressurized cleaning fluid, for a predetermined amount of time, upon the entirety of interior facing surfaces of the lubricant run-down tank causes the heated pressurized cleaning fluid to strike and cover the interior facing surfaces of the interior of the lubricant run-down tank and remove accumulated contaminants from the interior surfaces of the lubricant run-down tank, and prevents channeling of the heated pressurized cleaning fluid, within the interior volume.

12. The method of claim 7 and wherein the at least one fluid nozzle opening defined in a generally spherical shaped body of the outlet spray nozzle is angular relative to an axis of rotation of the generally spherical shaped body.

13. The method of claim 1 and wherein the at least one fluid nozzle opening defined in a generally spherical shaped body of the outlet spray nozzle is angular relative to an axis of rotation of the generally spherical shaped body.

14. The method of claim 1 and wherein the heated and pressurized cleaning fluid is pressurized to a pressure between 25 psi and 150 psi.

15. The method of claim 1 and wherein the heated and pressurized cleaning fluid flows through the outlet spray nozzle at a flow rate of approximately 10-40 gallons per minute (GPM).

* * * * *